United States Patent
Schatz et al.

[11] Patent Number: 6,055,807
[45] Date of Patent: May 2, 2000

[54] METHOD AND APPARATUS FOR REDUCING EXHAUST GAS EMISSIONS

[75] Inventors: Oskar Schatz, Gauting; Bernhard Schatz, Herrsching, both of Germany

[73] Assignee: Schatz Thermo Gastech GmbH, Erling-Andechs, Germany

[21] Appl. No.: 09/060,781

[22] Filed: Apr. 15, 1998

[30] Foreign Application Priority Data

Apr. 16, 1997 [DE] Germany ............ 197 15 921

[51] Int. Cl.$^7$ .................................... F01N 3/00
[52] U.S. Cl. .................. 60/274; 60/284; 60/287; 60/292; 60/324
[58] Field of Search .............. 60/274, 287, 288, 60/289, 324, 292, 293, 300, 284, 320

[56] References Cited

U.S. PATENT DOCUMENTS

| | | | |
|---|---|---|---|
| 3,961,478 | 6/1976 | Lange ........................................ | 60/277 |
| 4,506,505 | 3/1985 | Melzer ...................................... | 60/278 |
| 4,848,082 | 7/1989 | Takahahi et al. . | |
| 5,410,875 | 5/1995 | Tanaka et al. ............................. | 60/288 |
| 5,517,820 | 5/1996 | Kuroda et al. ............................ | 60/274 |
| 5,845,486 | 12/1998 | Yamashita et al. ....................... | 60/274 |

FOREIGN PATENT DOCUMENTS

| | | |
|---|---|---|
| 0 809 000 A2 | 11/1997 | European Pat. Off. . |
| 0 809 000 A3 | 6/1998 | European Pat. Off. . |
| 41 06 588 A1 | 9/1992 | Germany . |
| 195 43 219 C1 | 12/1996 | Germany . |

OTHER PUBLICATIONS

Effelsberg, Erwin u.a.: Untersuchungen zur Abgasnachbehandlung an Grossdieselmotoren. In: MTU Focus 2, 1993, S. 26–32.

*Primary Examiner*—Thomas Denion
*Assistant Examiner*—Binh Tran
*Attorney, Agent, or Firm*—Harness, Dickey & Pierce, PLC

[57] ABSTRACT

A method and an apparatus for reducing harmful emissions in the exhaust gases of an internal combustion engine which may be a Diesel engine or an Otto engine operated by a lean fuel air mixture. The exhaust gases are subjected to a catalytic treatment for oxidizing carbon monoxide and hydrocarbons, and the exhaust gases are throttled to increase their temperature under operative conditions of heat deficiency such as at cold start. The exhaust gases are subjected to an additional catalytic treatment for reducing nitrogen oxides in a deoxidation means. The throttling of the exhaust gases is controlled such that the temperature of the exhaust gases will be within a predetermined temperature range at which said deoxidation means is operative.

7 Claims, 1 Drawing Sheet

METHOD AND APPARATUS FOR REDUCING EXHAUST GAS EMISSIONS

The present invention relates to a method and an apparatus for reducing harmful emissions in the exhaust gases of an internal combustion engine of the type operated by a lean fuel air mixture. In this type of combustion engines it is usual to subject the exhaust gases to a catalytic treatment for oxidizing carbon monoxide and hydrocarbons. Furthermore it has become known to throttle the exhaust gases in order to increase their temperature under operative conditions of heat deficiency.

A method and an apparatus of this type have become known from German application 195 00 476 A1. In this type of method and apparatus the exhaust gases are throttled by a throttle valve at cold start of the engine in order to increase the temperature of the exhaust gases as rapidly as possible. As a result thereof efficiency of the internal combustion engine is improved and the duration for the catalytic converter to become operative is reduced so as to reduce harmful exhaust gas emissions at cold start. Shortly after starting the engine, the catalytic converter will be operative to oxidize carbon monoxide (CO) and hydrocarbons (CH) so as to convert them into carbon dioxide ($CO_2$) and, respectively, water ($H_2O$). When the catalytic converter has reached its operative temperature, the throttling device will be "turned off" because the catalytic converter will remain operative due to heat produced by combustion of CO and CH even if the temperature of the exhaust gases will decrease below the operative temperature of the catalytic converters at times. Under certain operative conditions, in particular when the engine is "hot" throttling of the exhaust gases will cause an increase of $NO_x$ and particle emissions.

When a three-way-catalytic converter is being used in Otto engines as is usual, the toxic nitrogen oxide ($NO_x$) additional to the CO and CH emissions are substantially eliminated by conversion thereof into harmless nitrogen molecules. For operating a three-way-catalytic converter, however, it is necessary to use a fuel air mixture of a substantially stoechiometric ratio ($\lambda=1$). This is why the three-way-catalytic converter is not suitable for engines such as Diesel engines of the direct injection type or Otto engines operated by a lean fuel air mixture. In such automotive vehicle engines it is usual to use only oxidation catalytic converters which are operative to convert only the CH and CO emissions of the exhaust gas.

To deoxidize $NO_x$ emissions deoxidation catalytic converters (denox catalytic converters) are being used to convert the toxic nitrogen oxides into harmless nitrogen molecules. Deoxidation catalytic converters unfortunately are operative only within a narrow temperature range of for example 200° ±10° C. The temperature of the exhaust gases is subject to large fluctuations depending on the operative conditions of the engine so that the temperature of the exhaust gases does not always remain within the above temperature range of the deoxidation catalytic converter during operation. Throttling of the exhaust gases would aggreviate this problem because in this case the temperature of the exhaust gases could exceed the upper limit of the temperature range already at operative conditions of heat deficiency, for example at cold start of the engine.

It is an object of the invention to provide a method and apparatus for reducing harmful emissions in the exhaust gases of an internal combustion engine of the type operated by a lean fuel air mixture, wherein the nitrogen oxide emissions are reduced in a simple and effective manner. In particular, efficiency of deoxidation catalytic converters in engines operated by lean air mixtures is to be optimized. Furthermore, the risk of an increase of $NO_x$ emissions in engines using exhaust gas throttling is to be limited such that such increase is less than the improvement resulting from the throttling.

To this end the present invention provides a method of reducing harmful emissions in the exhaust gases of an internal combustion engine of the type operated by a lean fuel air mixture, wherein the exhaust gases of the internal combustion engine are subjected to a catalytic treatment for oxidizing carbon monoxide and hydrocarbons and wherein the exhaust gases are throttled in order to increase their temperature under operative conditions of heat deficiency, the improvement of which comprises subjecting the exhaust gases to an additional catalytic treatment in a deoxidation means for deoxidizing nitrogen oxides, said deoxidation means being operative only within a predetermined temperature range with the amount of throttling of the exhaust gases being controlled such that the temperature of the exhaust gases at least in the area of said deoxidation means will be within said predetermined temperature range.

Furthermore, the invention provides an apparatus for reducing harmful emissions in the exhaust gases of an internal combustion engine of the type operated by a lean fuel air mixture, comprising at least one oxidation catalytic converter, at least one deoxidation catalytic converter, said deoxidation catalytic converter being operative only within a predetermined temperature range, variably adjustable throttle valve means for throttling the exhaust gases, and control means for controlling said throttle valve means such that the temperature of the exhaust gases will be within said predetermined temperature range at least in the area of said deoxidation catalytic converter.

In accordance with the present invention throttling of the exhaust gases is used to control the temperature of the exhaust gases such that it will remain permanently within a predetermined temperature range of for example ±20° K, preferably ±10° K, i.e. the temperature range wherein the deoxidation means or the deoxidation catalytic converter is operative. Accordingly, the present invention teaches to continuously control the amount of throttling of the exhaust gases, which is in contrast to the prior art wherein, at operative conditions of heat deficiency, a predetermined amount of throttling is initially "switched on" and will be "switched off" when a predetermined temperature of the engine will have been reached. The invention allows in a simple manner to operate the deoxidation catalytic converter—already at cold start but also thereafter—at its optimal efficiency so that $NO_x$ emissions will be drastically reduced.

Efficient control of the exhaust gas throttling and of the temperature of the exhaust oases requires a throttling device which responds rapidly to varying operative conditions. This is why a frictionless variably controllable throttle valve is preferred to be used as throttling device.

A preferred embodiment of the present invention will be explained in more detail with reference to the drawings wherein.

Figure 1:
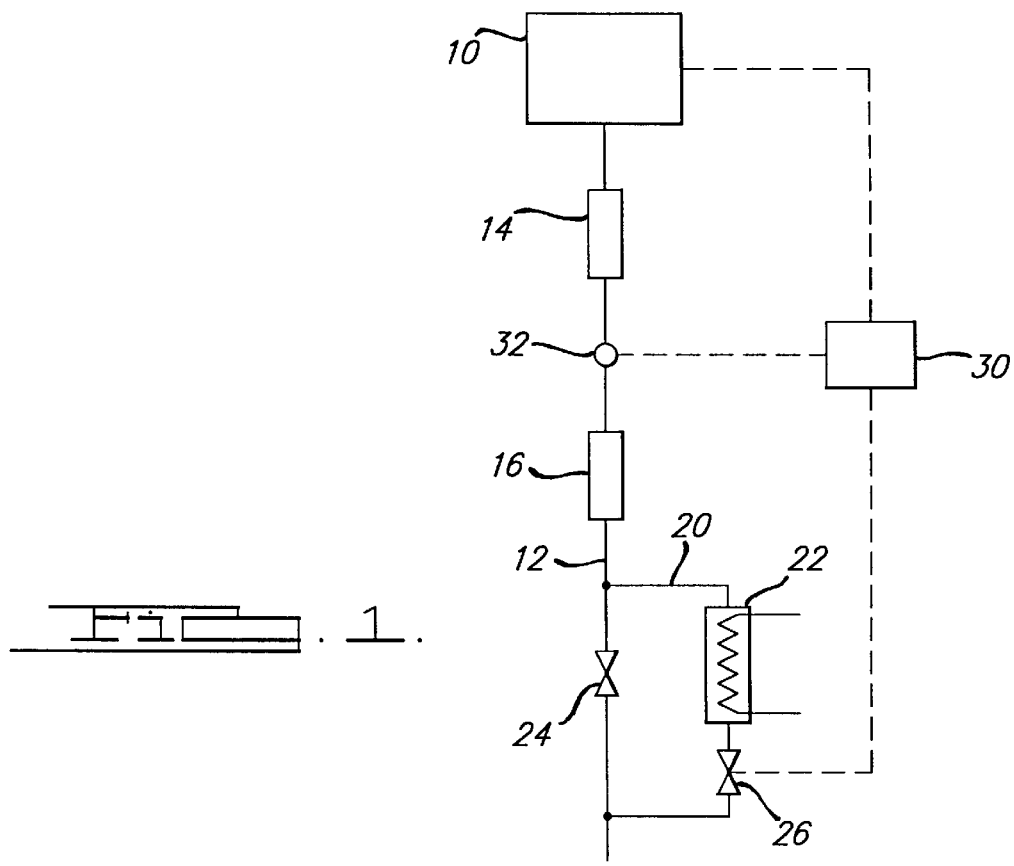
FIG. 1 is a diagrammatic representation of a system for catalytic treatment of the exhaust gases of a combustion engine.

In FIG. 1 the reference numeral 10 designates an automotive internal combustion engine operated by a lean fuel air mixture, in particular a Diesel engine of the direct injection type or a so-called meagre engine (an Otto engine operated by a lean fuel air mixture). An exhaust gas conduit 12 of the combustion engine 10 extends through an oxidation catalytic converter 14 for oxidizing CO and HC emissions and a deoxidation catalytic converter 16 for deoxidizing $NO_x$, with said catalytic converters being connected in series.

A bypass conduit 20 is connected in parallel to a portion of the exhaust gas conduit 12 which includes a bypass valve 24, and extends through an exhaust gas heat exchanger 22. The bypass conduit 20 extends through a throttling device comprising a throttle valve 26 which allows to throttle the exhaust gases when the by-pass valve 24 is closed so that the exhaust gases flow through the bypass conduit 20.

The throttle valve 26 is a frictionless valve of continuously variable flow cross-sectional area. The throttle valve 26 is connected to a control device 30 which is operative to control the adjustable throttle valve 26 in response to operative parameters of the internal combustion engine such as speed, load, average engine temperature etc. and/or in response to the temperature in the area of the deoxidation catalytic converter 16 as sensed by a temperature sensor 32 as will be explained in more detail.

It is to be noted that the throttle valve 26 may be disposed at any location in the exhaust gas conduit 12 between the engine 10 and the location where the exhaust gases are discharged into the ambient atmosphere. The catalytic converters 14 and 16 may be integrated in a common housing, and the catalytic material for oxidation and deoxidation can be the same. Furthermore, the catalytic converters each may be divided in a preconverter and a main converter. In this case the preconverter which is closer to the engine can be heated more rapidly and by exhaust gases of higher temperatures than the main converter which is more remote from the engine, because the exhaust gases are cooled on their way from the preconverter to the main converter. Dividing the converters into preconverters and main converters in combination with a throttle valve allows for an improved control strategy.

Figure 2:
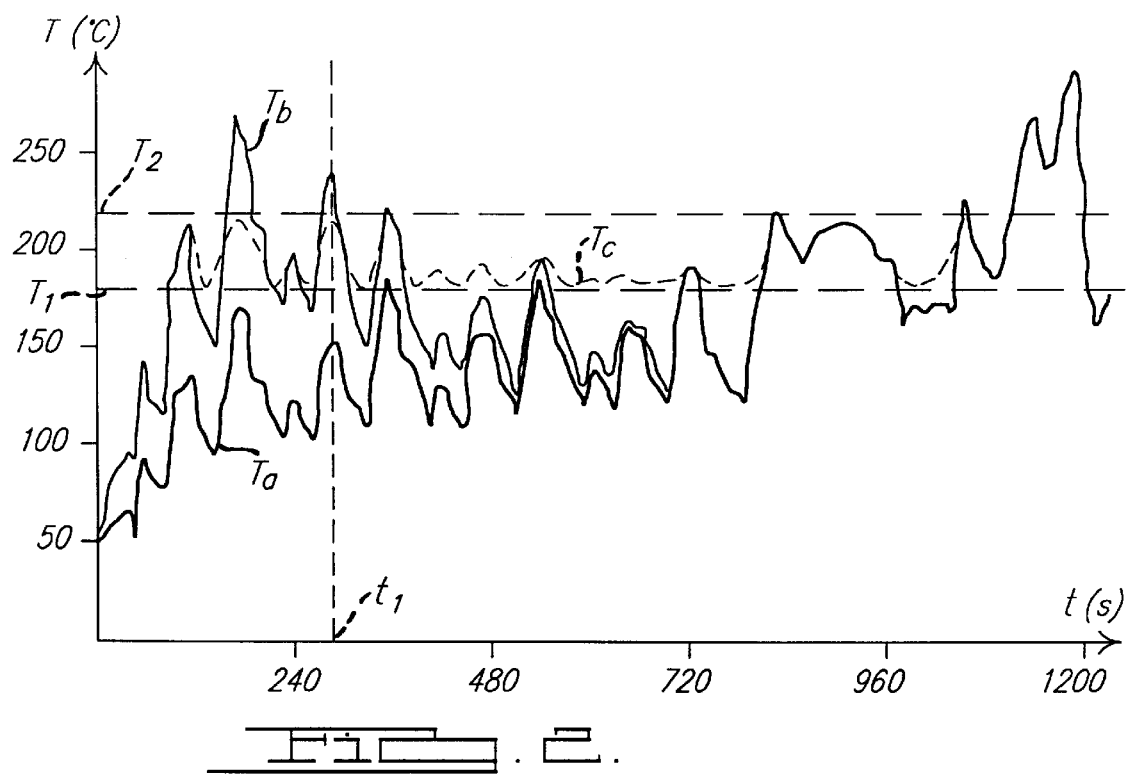
FIG. 2 is a diagram depicting the temperature T of the exhaust gases versus the time t for three different systems.

For an explanation of the operation of the system as shown in FIG. 1, attention is drawn to FIG. 2. In FIG. 2 the abscissa designates time t, and the ordinate depicts the temperature T of the exhaust gases at the outlet of the engine. The curves $T_a$ and $T_b$ relate to Diesel engines of the prior art whereas the curve $T_c$ (dotted lines) relates to a Diesel engine of the present invention.

The curve $T_a$ represents the temperature of the exhaust gases at the outlet of a Diesel engine which includes no heat exchanger 22 and no throttle valve 26, i.e. which is operated without throttling of the exhaust gases. As is apparent the temperature will reach a value of approximately 200° C. after about 350 seconds for the first time and then will be decreased again substantially below this value.

The curve $T_b$ represents the temperature of the exhaust gases at the outlet of a Diesel engine including an oxidation catalytic converter as disclosed in German patent application 195 00 476 mentioned above, wherein a throttle valve for throttling the exhaust gases is provided. The throttle valve is a valve of a fixed opening cross-sectional area, which is caused to open at the time $t_1$ when the engine has reached its operative temperature (i.e. after 300 seconds) i.e. when the temperature of the exhaust gases presumably has reached a temperature sufficient for the oxidation catalytic converter to become operative. The curve $T_b$ then gradually merges with the curve $T_a$.

As mentioned above effective operation of a deoxidation catalytic converter requires the temperature of the exhaust gases to be within a predetermined temperature range of for example 200° C. ±10° C. This is indicated in FIG. 2 by dotted temperature lines $T_1$ and $T_2$. As may be seen in FIG. 2, the curve $T_b$ will be outside of this temperature range already shortly after engine start. In particular, the temperature $T_b$ exceeds the upper temperature limit $T_2$ of the temperature range already in the initial phase due to the exhaust gases being throttled.

In a Diesel engine incorporating the present invention, i.e. which includes the deoxidation catalytic converter 16 and the variably controllable throttle valve 26 additional to the oxidation catalytic converter 14, opening of the throttle valve 26 is continuously controlled by the control device 30 such that the temperature of the exhaust gases will remain within the predetermined temperature range between $T_1$ and $T_2$. This situation is represented by the dotted curve $T_c$.

As a result the deoxidation catalytic converter 16 operates at optimal efficiency so as to provide for optimal reduction of the $NO_x$ emissions. Furthermore, the use of the variably controllable throttle valve eliminates the excessive exhaust gas temperature peaks so as to avoid an increase of the $NO_x$ emissions.

What we claim is:

1. A method of reducing harmful emissions in the exhaust gases of an internal combustion engine of the type operated by a lean fuel air mixture, wherein the exhaust gases of the internal combustion engine are subjected to a catalytic treatment for oxidizing carbon monoxide and hydrocarbons and wherein the exhaust gases are throttled in order to increase their temperature under operative conditions of heat deficiency, the improvement of which comprises subjecting the exhaust gases to an additional catalytic treatment in a deoxidation means for deoxidizing nitrogen oxides, said deoxidation means being operative only within a predetermined temperature range, with the amount of throttling of the exhaust gases being continuously varied such that the temperature of the exhaust gases at least in said deoxidation means will be within said predetermined temperature range.

2. A method as claimed in claim 1, wherein a deoxidation catalytic converter is used as said deoxidation means and the extent of said predetermined temperature range is ±20° K at most.

3. A method as claimed in claim 1, wherein a deoxidation catalytic converter is used as said deoxidation means and the extent of said predetermined temperature range is ±10° K at most.

4. An apparatus for reducing harmful emissions in the exhaust gases of an internal combustion engine of the type operated by a lean fuel air mixture, comprising at least one oxidation catalytic converter, at least one deoxidation catalytic converter, said deoxidation catalytic converter being operative only within a predetermined temperature range, variably adjustable throttle valve means for throttling the exhaust gases, and control means for continuously controlling said throttle valve means such that the temperature of the exhaust gases will be within said predetermined temperature range at least in said deoxidation catalytic converter.

5. An apparatus as claimed in claim 4, wherein said throttle valve means is disposed in a bypass conduit connected in parallel to an exhaust gas conduit.

6. An apparatus as claimed in claim 4, wherein said bypass conduit extends through an exhaust gas heat exchanger.

7. An apparatus as claimed in claim 4, wherein said internal combustion engine is a Diesel engine of the direct injection type or an Otto engine operated by a lean fuel air mixture.

* * * * *